United States Patent [19]
Johnson

[11] Patent Number: 5,289,704
[45] Date of Patent: Mar. 1, 1994

[54] CABLE LOCK WITH CONCEALED STORAGE

[76] Inventor: Lawrence L. Johnson, 1163 Englewild Dr., Glendora, Calif. 91740

[21] Appl. No.: 946,935

[22] Filed: Sep. 16, 1992

[51] Int. Cl.⁵ .............................................. E05B 67/06
[52] U.S. Cl. ......................................... 70/30; 70/49; 70/58; 70/233; 280/814
[58] Field of Search ................. 70/30, 33, 49, 57, 58, 70/312, 229-236, 225-227, 201-203, 209-212; 280/288.4, 814, 816, 819

[56] References Cited

U.S. PATENT DOCUMENTS

| | | | |
|---|---|---|---|
| 3,130,571 | 4/1964 | Neumann | 70/58 |
| 3,297,333 | 1/1967 | Schwedt et al. | |
| 3,335,585 | 8/1967 | Stratton | 70/58 |
| 3,354,675 | 11/1967 | Quigg | 70/58 |
| 3,687,472 | 8/1972 | Struble, Jr. | 280/11.37 B |
| 3,899,904 | 8/1975 | Brimhall, II | 70/58 |
| 4,012,930 | 3/1977 | Benson | 70/49 X |
| 4,023,387 | 5/1977 | Gould | 70/233 |
| 4,064,714 | 12/1977 | Treslo | 70/233 X |
| 4,177,541 | 12/1979 | Seakan | 70/18 X |
| 4,186,576 | 2/1980 | Means et al. | 70/233 |
| 4,267,715 | 5/1981 | Aylesworth | 70/58 |
| 4,379,393 | 4/1983 | Schott et al. | 70/58 X |
| 4,597,273 | 7/1986 | Reichenberger | 280/814 X |
| 4,610,152 | 9/1986 | Duringer | 70/322 X |
| 4,870,843 | 10/1989 | Lundberg | 70/18 X |
| 4,896,517 | 1/1990 | Ling | 70/18 |
| 4,970,883 | 11/1990 | Johnson | 70/30 |

FOREIGN PATENT DOCUMENTS

| | | | |
|---|---|---|---|
| 3046810 | 7/1982 | Fed. Rep. of Germany | 70/233 |
| 2276210 | 1/1976 | France | 70/233 |
| 2306119 | 10/1976 | France | 70/233 |
| 2584612 | 1/1987 | France | 280/819 |
| 7806670 | 12/1979 | Netherlands | 70/233 |
| 8100478 | 9/1981 | Netherlands | 70/233 |
| 585592 | 2/1947 | United Kingdom | 70/233 |
| 9100949 | 1/1991 | World Int. Prop. O. | 70/233 |
| 9108365 | 6/1991 | World Int. Prop. O. | 70/58 |

Primary Examiner—Peter M. Cuomo
Assistant Examiner—Suzanne L. Dino
Attorney, Agent, or Firm—Kyle W. Rost

[57] ABSTRACT

An improved cable lock having a lock housing and a flexible shackle has a longitudinally elongated latch housing with a cylindrical side surface in which is formed a latch reception slot, receiving an L-shaped latch body. The latch body fits flush with the housing surface and is released by rocking one of its arms. A resilient ring is carried on the axis of the lock housing and has its circumferential surface exposed along the cylindrical side of the lock housing. A mechanism selectively compresses and decompresses the ring, respectively causing the ring to expand or retract radially for friction locking into a storage tube. A clamp is provided for mounting the storage tube into the seat post of a cycle, and a guide tube assists passage around the bend.

8 Claims, 2 Drawing Sheets

CABLE LOCK WITH CONCEALED STORAGE

TECHNICAL FIELD

The invention generally relates to locks and more specifically to portable locks, especially padlocks that are combination controlled. The invention also relates to locks for special application to portable articles, especially cycles. Further, the invention relates to locks having a flexible shackle such that the lock can be concealed for storage inside apparatus having a tubular element as a part thereof.

BACKGROUND ART

A lock having a flexible shackle such that the lock can be stored in a tubular housing such as the handle bar of a cycle is shown in U.S. Pat. No. 4,970,883 to Johnson. Additional prior art, as shown by U.S. Pat. No. 3,354,675 to Quigg, has provided for a cable lock incorporated into a ski pole and having its ends permanently attached between separable pole portions. A coaxial combination lock selectively permits the handle portion of the pole to be removed so that the midsection of the cable can be wrapped around the poles and skis, after which the handle is reassembled and locked to the pole by the lock mechanism.

Similarly, U.S. Pat. No. 3,297,333 to Schwedt et al. provides for a ski pole having a wrist strap with one releasable end and one permanently attached end. An end mounted combination lock on the pole handle allows release and relocking of the releasable end, permitting the wrist strap to serve as a shackle to be wrapped about the remaining equipment.

Another ski pole mounted lock is disclosed in U.S. Pat. No. 4,267,715 to Aylesworth. A cable is permanently mounted by one end within the pole, while the opposite, free end can be freely extended and wrapped around ski equipment. The free end then is engaged and wrapped around ski equipment. The free end then is engaged between telescoping jaws on the pole, which are controlled by a lock carried coaxially on the pole.

U.S. Pat. No. 3,335,585 to Stratton discloses another ski pole lock in which the cable has an enlarged end that is retained within the pole. The second, free end carries a keeper and can be withdrawn through the pole's handle and engaged about ski equipment. Thereafter the keeper on the second end is inserted into a lock carried in the handle and secured.

U.S. Pat. No. 3,899,904 to Brimhall, II, is similar to Stratton, with the additional feature that one ski pole may carry the captive end of the cable, while the second ski pole may carry a lock that received the keeper on the free end of the cable when the cable is engaged about ski equipment.

U.S. Pat. No. 3,687,472 to Stuble, Jr., discloses the use of a hollow ski pole for storage of a cable and cylindrical lock. A cap on the pole's handle covers the storage passage and can be opened to permit the lock and cable to be withdrawn. Otherwise, the cable lock is capable of forming a locked loop around the ski equipment when the lower end of the cable is inserted into the top of the lock. It is proposed that the lower end of the cable be elastically fastened to the bottom of the pole cavity by a retention bungee. Otherwise, it appears that this lock mechanism is not secured within the pole, but merely is housed inside.

From the state of the prior art, it can be seen that cable locks have been incorporated into equipment that stores some or all of the cable and lock. However, most of the prior art locks require some degree of structural alteration to the equipment, which hinders wide usage of such locks unless a manufacturer chooses to incorporate such a lock as part of the original equipment design. Other locks purport to be added with only minor modification of the equipment, and these are the types of locks to which the present invention is addressed.

Another problem is that if the coaxial lock in many of the above designs were to fail, the cable cannot be removed or used. In other designs, even if the cable can be reached, the ski pole or other host item no longer can function as a lock.

Further, if the handle bar of a cycle must be used for storage of a lock, there could be interference with other items such as wiring or cables that might be routed in the handle bar.

So as to eliminate the possibility of interference and the need for special adaptation, it would be desirable to create a cable lock that, at least in one embodiment, requires absolutely no modification to existing tubular storage areas of the equipment.

Further, it would be desirable to create a concealed storage system that employs notoriously vacant tubular members such that the cable lock can be inserted in a streamlined process.

Finally, it would be desirable to create a cable lock that stores in a tube, wherein the lock is free of all varieties of lateral obstructions or protrusions. Such a lock design minimizes the opportunities for interference with the interior of a tube.

To achieve the foregoing and other objects and in accordance with the purpose of the present invention, as embodied and broadly described herein, the cable lock and concealed storage system of this invention may comprise the following.

DISCLOSURE OF INVENTION

Against the described background, it is therefore a general object of the invention to provide an improved cable lock that can be stored in an available tube without requiring any modification of the tube.

Another object is to provide a storage system for a cable lock, wherein a relatively empty and straight tube can be adapted for Biorage of the lock.

A related object is to provide a lock of streamlined design, such that the lock has little ability to interfere with its surroundings during storage in a tube.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, in an improved cable lock of the kind formed of a lock housing and a flexible shackle, the lock housing has the approximate configuration of a cylinder, elongated on its axis from front to rear. A longitudinally elongated latch housing has a generally cylindrical side surface, defining through the side surface a longitudinally elongated latch reception slot. A generally L-shaped latch body is receivable in the latch reception slot and has first and second arms. The first arm of the latch body is disposed generally longitudinally to the latch housing, extends forwardly from the second arm, and has an outer face defining a segment of the cylindrical side surface when the latch body is received in said slot. The second arm of the latch body is disposed generally radially to the cylindrical housing and has a plunger recess in its rear face, with the result that the latch body is rockable with respect to the latch housing by pressure applied laterally to the first arm. A lock mechanism has differing open and closed configurations and is operatively connected to the latch housing. It has a plunger shaft selectively secured in the plunger recess, locking the latch body in place when the lock is in closed configuration, but resiliently biasing the plunger shaft into the latch body when the lock is in open position. Thus, the latch body is releasable from the latch housing in response to relative rocking of the latch body. A resilient ring is carried on the front to rear axis of the lock housing and has an annular surface exposed along the cylindrical side of the lock housing. A friction locking mechanism selectively compresses and decompresses the ring. Compressing causes the ring to expand radially, while decompressing allows the ring to retract radially.

The accompanying drawings, which are incorporated in and form a part of the specification illustrate preferred embodiments of the present invention, and together with the description, serve to explain the principles of the invention. In the drawings:

BEST MODE FOR CARRYING OUT THE INVENTION

Figure 1:
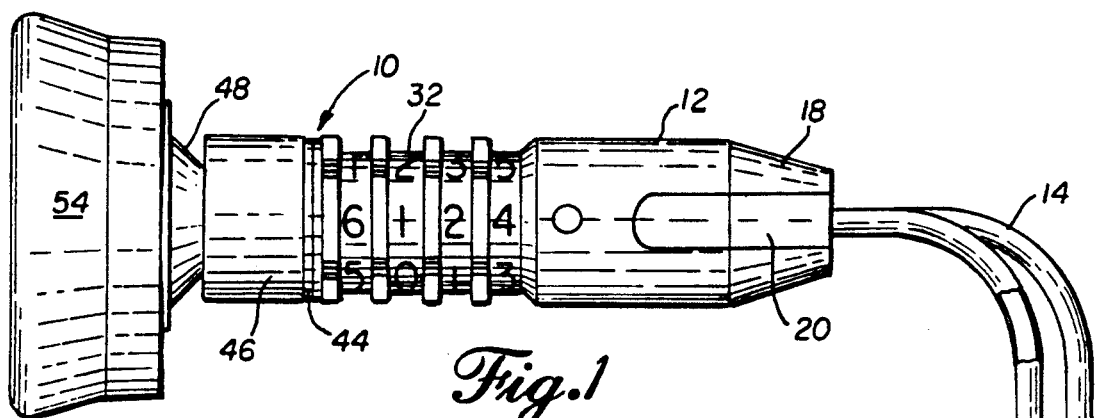
FIG. 1 is a plan view of the cable lock, with a central portion of the flexible shackle omitted.

The invention relates to a cable lock and to a storage device for the lock when it is not in use. With reference to FIG. 1, a lock assembly 10 is formed of two general components: a lock body or housing 12 and a flexible cable or shackle 14. The housing 12 is of streamlined design, with a narrow forward end joined to the shackle and a wider rear end opposite the shackle. The housing is generally in the form of an axially elongated cylinder so as to be adaptable to storage in a tubular member. The shackle is a cable of any desired length. The opposite ends of the cable are joined to the housing, forming a loop of cable that serves to engage or wrap the object to be secured by the lock. Because the lock is intended to be stored in a tube, the mid-point of the cable is fastened in a ferrule 16 and both halves exit the ferrule from the same end of the ferrule in close, parallel arrangement. Thus, the shackle is formed to retain an elongated, narrow profile that easily will slip into a tube. The lock housing and shackle together define a lock asbembly that is of streamlined, generally cylindrical shape, characterized by a lack of laterally protruding structures.

Figure 2:
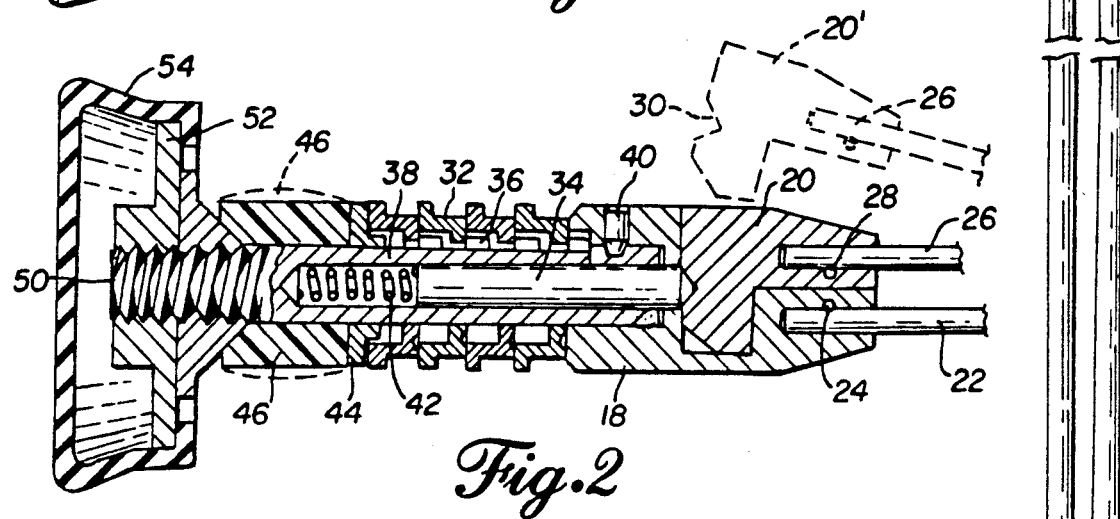
FIG. 2 is a cross-sectional view of the cable lock in closed configuration, showing in phantom the shackle end in open configuration and the retaining ring in compressed configuration.

The latch mechanism is best shown in FIG. 2 to be longitudinally elongated, having a generally cylindrical side surface. The narrow, forward end of the housing 12 is frusto-conical and is formed of a latch housing 18 that defines along one side a longitudinally elongated slot that receives a latch body 20. One end of the cable, the fixed end 22, is permanently attached to the forward end of the latch housing. An axial bore at this frusto-conical end of the latch housing receives the cable end 22, and a dowel pin 24 passes laterally through the cable end 22 to Becure the cable end permanently in the latch housing. The other end of the cable, the latched end 26, is permanently attached to the latch 20 in much the same way. An axial bore extends into the forward end of the latch and receives the cable end 26, and a dowel pin 28 passes laterally through the cable end 26 and secures the cable end in the latch. However, any other suitable means may be used to secure the cable ends, including adhesives such as epoxy glue, crimping, clamping, welding, or soldering. As shown in FIGS. 1 and 2, the latch body 20 fits into the latch housing with a smooth outer appearance, free of protrusions.

The latch body is L-shaped, having both a first, longitudinal arm, and a second, lateral arm. The first arm extends generally forwardly from the second arm. The latch body fits laterally or radially into a matching cavity or slot in the housing. The first arm is curved on its outside face as a segment of the generally cylindrical latch housing. Within the latch reception slot, the housing defines similarly shaped longitudinal and a lateral cavity portions. A plunger recess 30 in the rear side of the lateral arm of the latch receives the end of a spring-loaded plunger that retains the latch in the lateral arm of the cavity. Thus, the latch mechanism conforms to the cylindrical contours of the lock housing and has no laterally protruding parts. The shackle longitudinally engages the latch mechanism and is generally less wide than the lock housing. The latch slot provides sufficient clearance for the second arm so that the latch body is rockable by pressure applied to the first arm. When the plunger otherwise is free to move, rocking the latch body permits the latch to be freed of the plunger to open the lock. The L-shaped configuration of the latch body, especially in the recessed position of the second arm, has the added advantage of transferring any load on the cable to the latch housing without placing excessive loads on the inherently more fragile lock mechanism.

The lock mechanism can be shifted selectively between open and locked configurations. This mechanism is preferred to be a combination-style lock having a preselected number of rotatable combination dials 32. Four such dials are shown in the drawings, although more or less may be selected for use. Each dial 32 is rotatably carried on a plunger shaft 34, having a separate key 36 that engages each dial. In a conventional manner, each dial is in open configuration, permitting axial movement of its respective key, only when in one relative position of rotation with respect to the shaft. Otherwise, the lock remains in closed configuration, locking the plunger shaft in the plunger recess of the latch body. All four dials must be turned to the correct combination position in order to place the lock in open configuration, which permits the plunger shaft to move longitudinally in the housing 12. When the combination is correct, the latch is freed from the latch housing by pressing or pinching the latch body at the forward, frustoconical end of the latch housing. Then, the pivotal movement of the latch body pushes back the plunger against its resilient biasing, and the latch body pops free of the housing, approximately assuming the position of the phantom outline 20' in FIG. 2. A key-actuated lock could be employed, in which case a conventional tumbler lock would be substituted for the combination lock mechanism just described.

A plunger means is controlled by the lock mechanism and, in turn, fastens or releases the latch. An elongated sleeve 38 carries the plunger shaft 34 in a central, longitudinal bore for longitudinal movement. The open end of the bore faces forward, toward the latch housing. As previously described, the tip of the plunger shaft extends out of the bore to engage the latch body. The sleeve is longitudinally slotted to permit the keys 36 to extend radially through the slot, and the dials 32 are carried for rotation on the surface of the sleeve. A pin 40 locks the sleeve to the latch housing in fixed relative position, thereby connecting the latch housing to the lock mechanism. A compression spring 42 is carried at the inner end of the bore to push the plunger shaft resiliently toward the latch housing. In this way, the latch body is positively engaged whenever the latch body is inserted into the latch housing cavity. Further, the latch can pop free of the latch housing cavity by lateral pivotal pressure, such as on the longitudinally extending arm of the latch body, at the frusto-conical tip of the latch housing. Such lateral pressure provides sufficient force to push back the plunger against compression spring 42.

The sleeve also carries a meanb for securing the housing in a storage tube. The preferred mechanism is a resilient, expandable friction ring, which generally is carried on the front to rear axis of the lock housing. The annular surface of this ring, exposed along the cylindrical side surface of the lock houbing, can be applied against the interior of a storage tube. A friction locking means selectively compresses or permits decompression of the ring. According to one suitable structure, at the rear end of the area carrying the combination dials, the sleeve carries a fixed annular flange 44. Juxtaposed on the sleeve 38 rearwardly of flange 44 is a flexible, resilient ring or tubular segment 46, formed, for example, of neoprene rubber or soft polyurethane. The sleeve carries a frusto-conical washer 48 behind ring 46, with the forwardly extending nose of the washer wedged centrally into the ring. To control movement of the washer, the sleeve employs a threaded rear end 50, on which is carried a nut 52 having a wide shoulder. The nut is covered by rubber cap 54, which defines a knob that provides a good grip for turning the nut by hand. When nut 52 is advanced on threads 50 against washer 48, ring 46 is compressed between the washer and flange 44, causing it to expand radially, as shown in phantom as 46' in FIG. 2. The radial expansion of the ring provides a friction lock against the interior of any reasonably close fitting tube into which the lock has been inserted. A distinct benefit of this friction lock is that it can fasten in tubes having a considerable range of inside diameter. For example, a single ring can fasten within tubes of from sixteen to twenty-two millimeters, which accommodates the size of most tubing found in bicycles. In addition, the resilient ring provides a seal so that the lock is protected from moisture and dust when in storage. The friction lock can be released or decompressed by turning the nut in an opposite direction, allowing the ring to retract radially, while backing away from flange 44.

To operate the lock for storage, the shackle is inserted into a storage tube, ferrule first. Then the lock housing is inserted past the ring 46, bottoming the tube against washer 48 or nut 52. This much of the lock is sheltered in the tube while knob or cap 54 is larger than the diameter of the tube and remains outside the end of the tube. Rotating the knob in the appropriate direction to advance nut 52 expands ring 46 into a friction lock with the interior of the tube. Removal of the lock is by the reverse steps.

Figure 3:
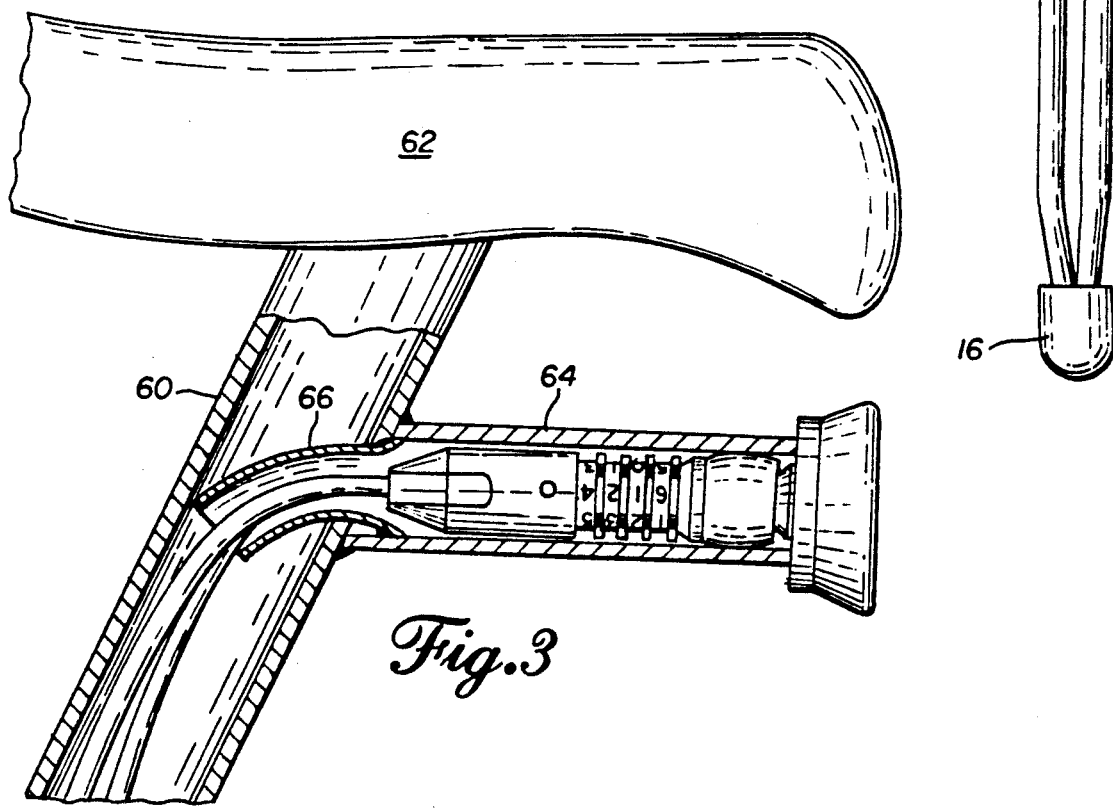
FIG. 3 is a side elevational view in partial cross-section, showing the cable lock and a first embodiment of a storage system.

While the lock can be stored in any tube of suitable size, the invention contemplates a particular novel form of storage in the seat post of a cycle. This type of storage is desirable since the seat post is not known to be used for any other purpose. Thus, there would not be any likely interference with cables or wires, such as sometimes are routed inside handle bars. To enable seat post storage, the particular seat post 60 of FIG. 3 is preferred. This post serves to connect a seat 62 to the cycle frame in the normal way. In addition, one side of the post 60 carries a lock storage tube 64, which is slightly longer than the insertable portion of lock housing 12. The storage tube has an open outer end and is of sufficient diameter to receive the shackle and a portion of the lock housing including, at least, the resilient ring, when the ring is in decompressed condition. However, the storage tube is of small enough diameter that it can be contacted on its inside surface by the ring when the ring is in compressed configuration. At the junction of post 60 and tube 64, the seat post forms an aperture for passage of the shackle. A shackle guide 66 is attached to tube 64 and provides a downwardly curving tubular passageway into the seat post. The guide smoothly directs the shackle between the storage tube and the post so that, if the shackle has sufficient length, it eventually can enter the seat post tube of the frame.

Figure 4:
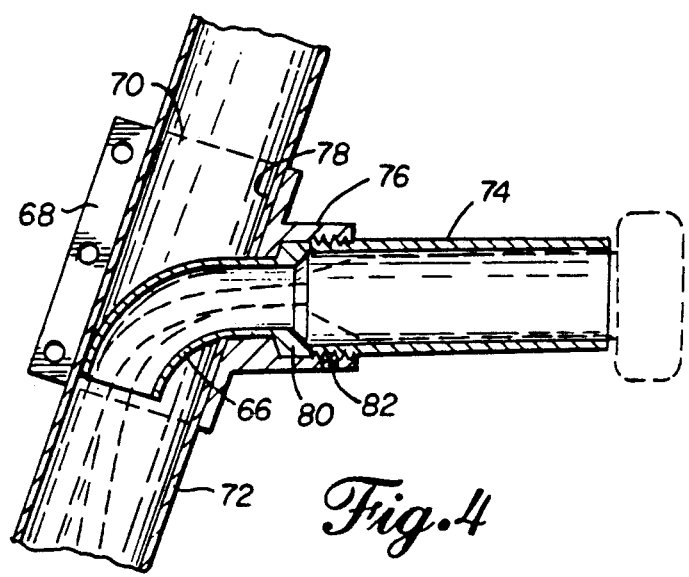
FIG. 4 is a view similar to FIG. 3, showing a second embodiment of the storage system.

The invention further contemplates that existing seat posts can be converted to receive the lock. For this purpose, clamp 68 shown in FIG. 4 is provided, which is provided with a first passage 70 traversing the clamp and receiving the seat post. An existing seat post 72 is drilled to receive a shackle guide 74. The clamp includes a socket 76, providing a second passage stemming from the side of the first passage and receiving the storage tube. The socket 76 can be used as a drill guide, if desired. Therefore, either before or after drilling, the clamp is secured around the post 72, and the drilled hole is aligned with socket 76. An inwardly directed shoulder 78 is located in socket 76 at the intersection with passage 70. The shackle guide is inserted in socket 76 and through the hole into the post 72, until the flanged end 80 of the guide rests against shoulder 78. The lock storage tube 74 then is inserted into the socket, such as by firmly screwing it in place until the end of the tube is substantially bottomed against the shoulder 78, at the same time securing the shackle guide at the bottom of the socket. A set screw 82 in the wall of the socket can be used to further secure the tube. In this way, an ordinary seat post aB converted to receive the cable lock for storage.

Figure 5:
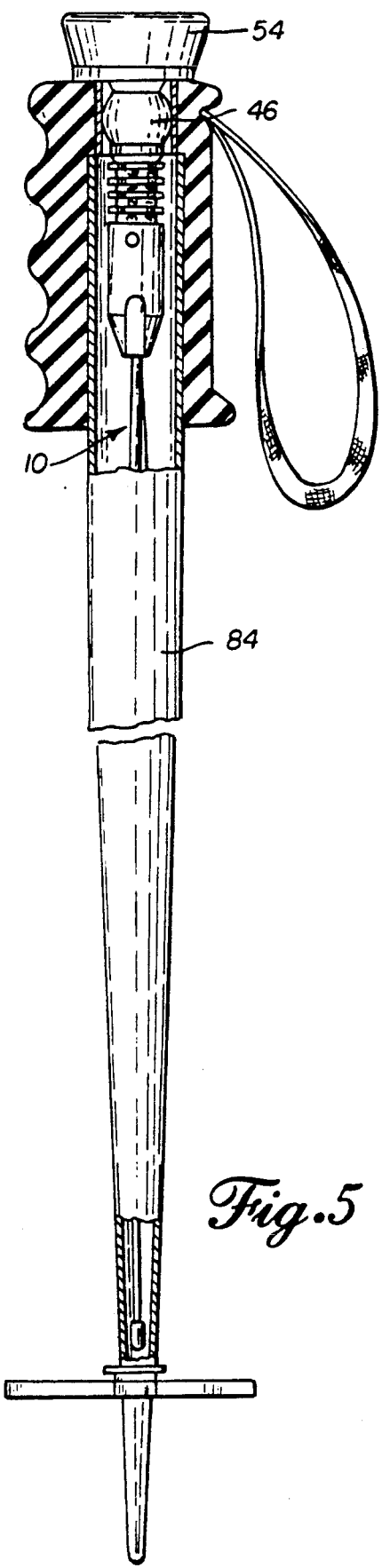
FIG. 5 is a side elevational view in partial cross-section, showing the cable lock stored in a ski pole.

With reference to FIG. 5, the cable lock 10 is suited for use with other tubular items, such as ski pole 84. In this embodiment, the top of the ski pole is open and receives the cable lock as previously described. Rubber cap 54 remains outside the pole and acts as a cushion on top of the pole. The rubber ring 46 is especially useful in this embodiment, since water and snow are readily present during skiing and should be kept out of the pole.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. A cable lock of the kind formed of a lock housing and a flexible shackle, wherein:

the lock housing has the approximate configuration of a cylinder, elongated on its axis from front to rear, and comprises:

a longitudinally elongated latch housing having a generally cylindrical side surface, defining through the side surface a longitudinally elongated latch reception slot;

a generally L-shaped latch body receivable in said latch reception slot and having first and second arms, the first arm of the latch body being disposed generally longitudinally to the latch housing, extending forwardly from the second arm, and having an outer face defining a segment of said cylindrical side surface when the latch body is received in said slot, and the second arm of the latch body being disposed generally radially to the cylindrical housing and having a plunger recess in its rear face, wherein the latch body is rockable with respect to the latch housing by pressure applied laterally to the first arm;

a lock means having differing open and closed configurations, operatively connected to said latch housing and having a plunger shaft selectively secured in said plunger recess and locking the latch body in place when the lock is in closed configuration, but resiliently biasing said plunger shaft into the latch body when the lock is in open position, whereby the latch body is releasable from the latch housing in response to relative rocking of the latch body;

a resilient ring carried on said front to rear axis rearwardly of said latch housing, having an annular surface exposed along the cylindrical side of the lock housing; and friction locking means for selectively compressing and decompressing said ring, in which compressing causes the ring to expand radially, and in which decompressing allows the ring to retract radially.

2. The cable lock of claim 1, wherein said flexible shackle comprises:

a cable having first and second opposite ends, wherein:

said latch housing defines an axial bore and said first cable end is secured therein; and said latch body defines an axial bore in said first arm, generally parallel to the longitudinal dimension of the latch housing, and said second cable end is secured therein.

3. The cable lock of claim 1, wherein said lock means comprises:

a combination lock having a plurality of combination dials carried on said plunger shaft;

a like plurality of keys carried on the plunger shaft, each key being positioned to be axially restrained from movement relative to one of said dials unless said dial is positioned to indicate a correct element of the combination.

4. The cable lock of claim 1, further comprising: a storage tube having an open end, wherein the tube is of sufficient diameter to receive said flexible shackle and a portion of said lock housing including, at least, said resilient ring when the ring is in decompressed condition; and the tube is of small enough diameter to be contacted on its inside circumference by said ring when the ring is in compressed condition.

5. The cable lock of claim 4, wherein said friction locking means comprises a knob having a diameter larger than said storage tube and located on the lock housing rearwardly of said ring.

6. The cable lock of claim 4, wherein said storage tube is attached to a cycle seat post, and further comprises:

a guide tube carried in the storage tube and seat post approximately at the intersection thereof and defining a curved tubular pathway guiding said shackle between the storage tube and seat post.

7. The cable lock of claim 4, further comprising:

a clamp joining said storage tube and seat post, wherein the clamp defines a first passage traversing the clamp and receiving the seat post, and a second passage laterally stemming from one side of the first passage and receiving the storage tube.

8. The cable lock of claim 7, wherein:

said clamp defines an inwardly directed shoulder in said second passage at the intersection with said first passage;

said guide tube has a flanged end, sized such that the flange is retained by said shoulder while substantially the remainder of the guide tube passes the shoulder; and said storage tube is received in the second passage substantially bottomed against the shoulder, securing the guide tube in place.

* * * * *